June 9, 1931. J. B. LADD 1,809,301
LOCKING COOPERATING THREADED ELEMENT
Filed Jan. 15, 1930
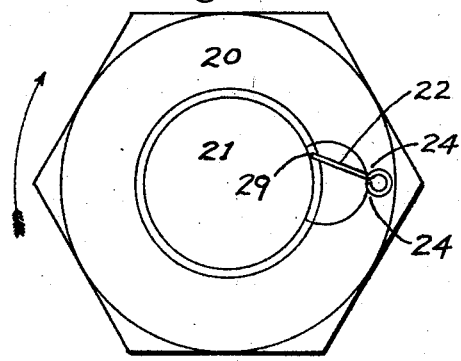
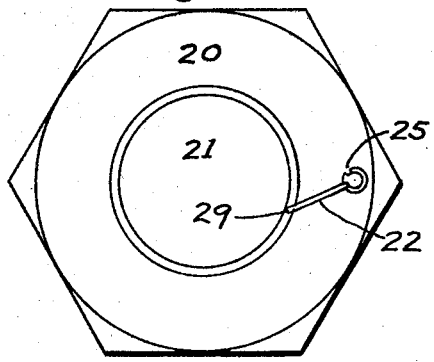
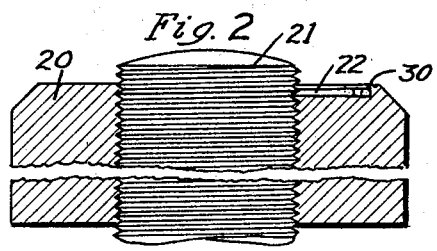
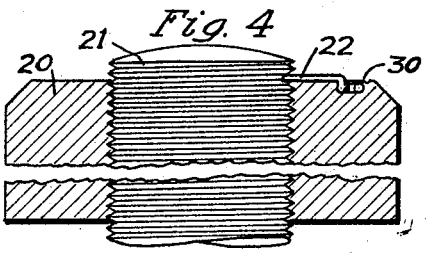
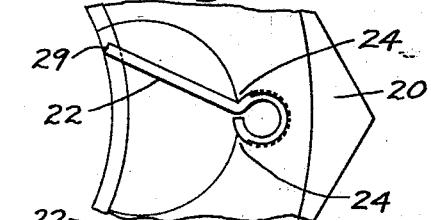
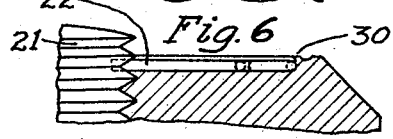
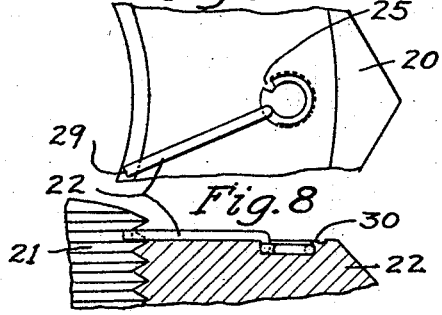
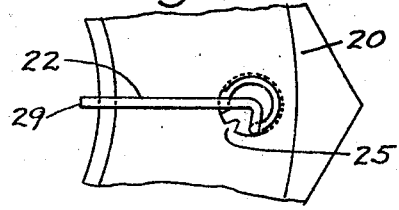
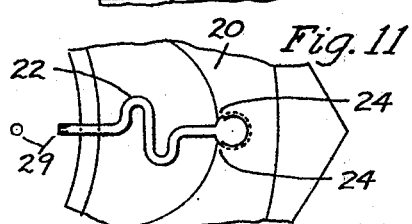
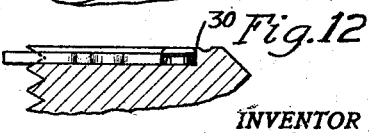
INVENTOR
James B Ladd
BY
his ATTORNEY Patented June 9, 1931

1,809,301

UNITED STATES PATENT OFFICE

JAMES B. LADD, OF ARDMORE, PENNSYLVANIA

LOCKING COOPERATING THREADED ELEMENT

Application filed January 15, 1930. Serial No. 420,853.

This invention relates to means for locking cooperating threaded elements, such as a nut to a bolt, for the purpose of holding the nut from working loose, and refers particularly to means for holding the threaded elements against relative rotation in either direction up to a predetermined rotary torque.

A further object is to provide locking means which will be simple and inexpensive and which will not require extreme accuracy of parts.

Other objects and advantages of the construction will be seen from the description following, and the accompanying drawings which illustrate, merely by way of example, suitable embodiments of the invention.

Fig. 1 is a plan view of a nut on a bolt with a locking pawl.

Fig. 2 is a part section and part elevation of the device shown in Fig. 1.

Fig. 3 is a plan view showing a modification.

Fig. 4 is a part section and part elevation of the structure shown in Fig. 3.

Fig. 5 is a fragmentary plan view on an enlarged scale of the structure shown in Fig. 1.

Fig. 6 is a part section and part elevation of the device shown in Fig. 5.

Fig. 7 is a fragmentary plan view on an enlarged scale of the structure shown in Fig. 3.

Fig. 8 is a part section and part elevation of the device shown in Fig. 7.

Fig. 9 is a fragmentary plan view on an enlarged scale of another modification.

Fig. 10 is a part section and part elevation of the device shown in Fig. 9.

Fig. 11 is a fragmentary plan view on an enlarged scale of another modification.

Fig. 12 is a part section and part elevation of the device shown in Fig. 11.

Similar numerals refer to similar parts throughout the several views.

Broadly described, my invention comprises a pawl 22, one end of which is rotatably seated and confined in a recess in the nut.

The pawl, which is formed of resilient material, is adapted to move angularly with respect to the axis of the nut and is so located and confined that when the nut is turned onto the bolt the free end of the pawl will be brought into forcible contact with the thread on the bolt and will resist the rotation of the nut in the reverse direction up to a predetermined torque, and will yield, when the torque is increased above the predetermined amount, to be moved angularly by the reverse rotation of the nut into a position in which it will resist the rotation of the nut in the opposite direction.

In general, when the nut 20, with my locking device, is put on a bolt 21 with a right-hand thread, the pawl 22 will automatically be brought into the position in which it is shown in Fig. 1, by the rotation of the nut in the direction of the arrow shown, and if the nut is forcibly turned in the reverse direction, the pawl will be moved across the radial line into the position in which it is shown in Fig. 3.

When the pawl is at the limit of its free angular movement, in either direction, its free end 29 extends into the threaded hole or bore of the nut, and when the nut is rotated onto the bolt said free end is forced beyond said free angular position and is brought into forcible contact with the thread on the bolt by the flexure of the pawl.

In accordance with my invention the pawl is always free to rotate in its seat through a slight angle either side of a radial line drawn through the axis of the seat and the center of the nut, but its angular movement is always positively limited by suitable abutments such as 24, shown in Figs. 1, 5 and 11, or by abutments 25, shown in Figs. 3, 7 and 9.

When the nut has been rotated on the bolt in the direction of the arrow, as in Fig. 1, and the pawl is forcibly in contact with the thread on the bolt, it is evident that if the nut is rotated in the reverse direction, with sufficient force to overcome the normal resistance of the pawl, the pawl must pass a radial position in passing over to the position shown in Fig. 3, and therefore, to permit the pawl to be forced by the rotation of the nut from the position shown in Fig. 1 to the position shown in Fig. 3, it is essential that the pawl must be shortened lengthwise, and this is accomplished by flexure of the part of the pawl in the seat when pawls of the form shown in Figs. 1, 3, 5, 7 and 9 are used, and by flexure of the pawl outside of the seat when a pawl of the form shown in Fig. 11 is used.

The pawl is confined in its seat by the edges of the seat being forced slightly over it, as shown at 30 in Figs. 2, 4, 6, 8 and 12, or by other suitable means.

The free end of the pawl, which contacts with the thread on the bolt, is preferably of a cylindrical form, as shown in Fig. 11, but may be of any form adapted to holding the nut against rotation, either by friction or by biting into the thread, or both.

What I claim is:—

1. A device for locking a nut to a bolt or the like comprising a pawl, one end of which is seated in a recess in a nut and confined therein, but free to turn therein around an axis approximately parallel with the axis of the nut, the pawl extending from its seat into the bore of the nut, and means co-acting with the pawl to limit its free angular movement to a small angle to either side of a radial position relative to the nut, said limiting means causing the free end of the pawl to lockingly engage the thread on the bolt when the pawl is flexed beyond either limit of its free angular motion.

2. A device for locking a nut to a bolt or the like comprising a pawl, one end of which is seated in a recess in a nut and confined therein, but free to turn therein around an axis approximately parallel with the axis of the nut, the pawl extending from its seat into the bore of the nut, means co-acting with the pawl to limit its free angular movement to a small angle either side of a radial position relative to the nut, said limiting means causing the free end of the pawl to lockingly engage the thread on the bolt when the pawl is flexed beyond either limit of its free angular motion, and means permitting the free end of the pawl to move toward its seat, when the nut is forcibly rotated in the reverse direction, to permit the pawl to be turned angularly past a radial position relative to the nut to engage the thread on the bolt on the opposie side to resist rotation of the nut in the reverse direction.

JAMES B. LADD.